Figure 1:
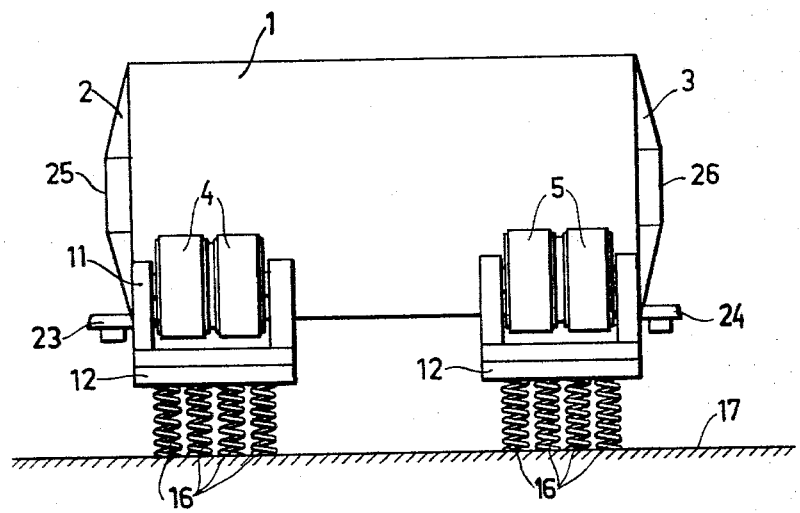

Nov. 9, 1965  A. N. SVENSSON ETAL  3,216,666
SUPPORTING SYSTEM FOR ROTARY DRUMS AND THE LIKE
Filed Feb. 4, 1963  7 Sheets-Sheet 1

INVENTORS

ASSAR N. SVENSSON
NILS R. ENGSTRÖM
By Irwin S. Thompson
ATTY.

Nov. 9, 1965  A. N. SVENSSON ETAL  3,216,666
SUPPORTING SYSTEM FOR ROTARY DRUMS AND THE LIKE
Filed Feb. 4, 1963  7 Sheets-Sheet 2
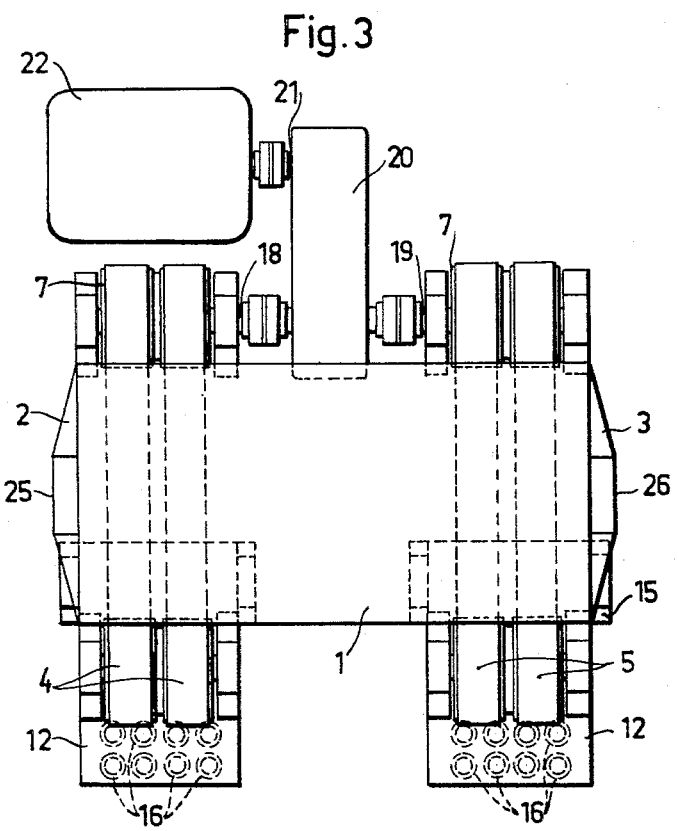
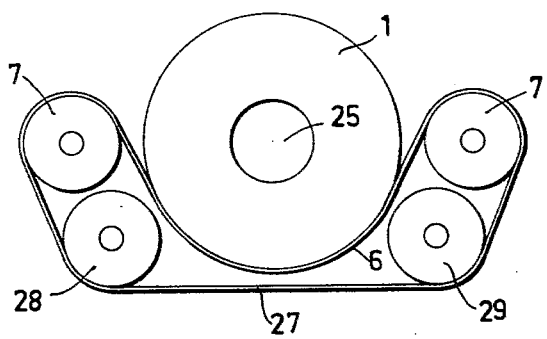
INVENTORS
ASSAR N. SVENSSON
NILS R. ENGSTRÖM
By Irwin S. Thompson
ATTY.

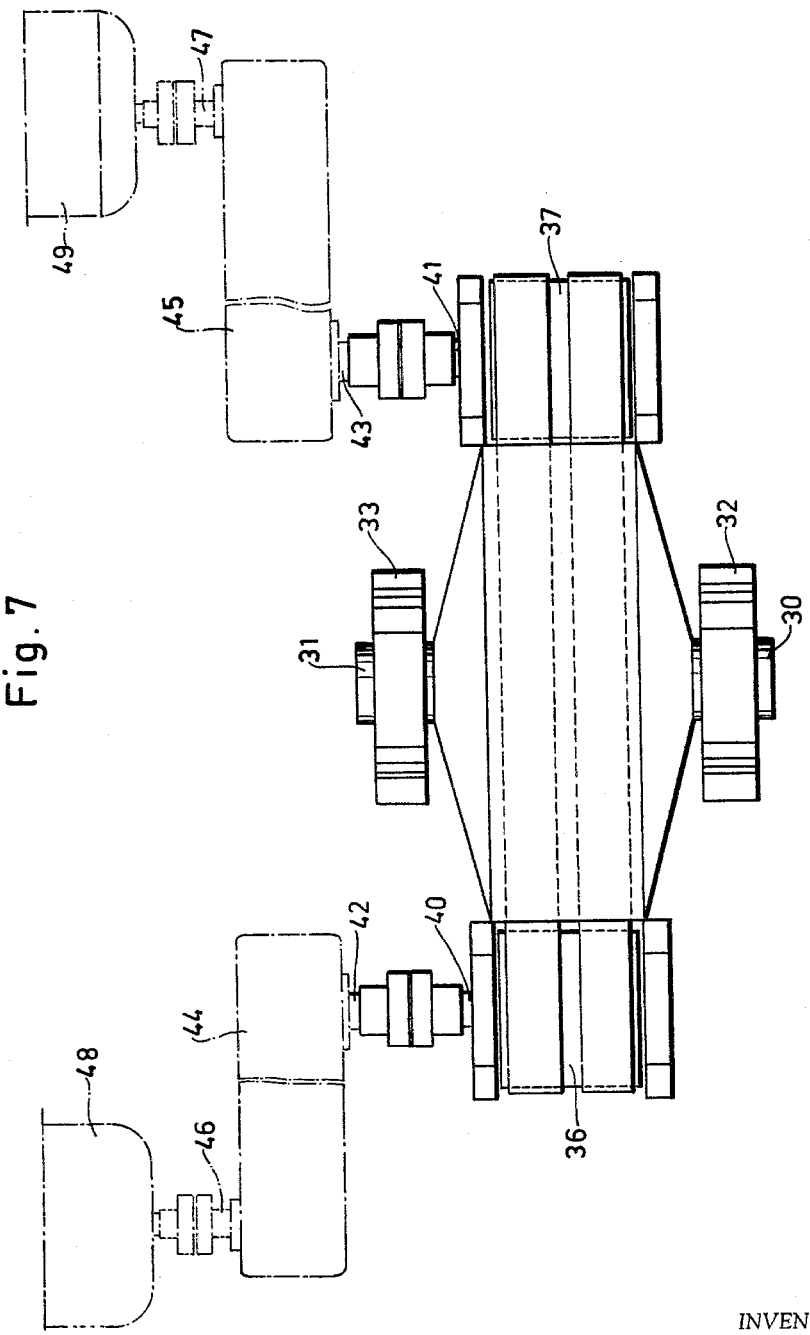

United States Patent Office 3,216,666
Patented Nov. 9, 1965

3,216,666
SUPPORTING SYSTEM FOR ROTARY DRUMS
AND THE LIKE
Assar Natanael Svensson, Ersmark, and Nils Ragnar Engström, Morgardshammar, Sweden, assignors to Morgardshammars Mek. Verkstads Aktiebolag, Morgardshammar, Sweden, a corporation of Sweden
Filed Feb. 4, 1963, Ser. No. 256,070
Claims priority, application Sweden, Feb. 6, 1963, 1,301/62
3 Claims. (Cl. 241—176)

For grinding ore there are used mills consisting of a horizontal drum which contains grinding members in the form of loose rods, balls or stones. One end wall of the drum has an inlet for material to be ground and the other end wall has an outlet for the ground material. Both the inlet and the outlet are formed by an opening or duct in a suitably hollow horizontal journal by means of which the drum is mounted in bearings.

In conventional constructions the drums have comparatively thick walls and are consequently heavy for which reason the bearings for the journals have to be very wide and even in other respects require large dimensions, especially in order to obtain sufficiently great bearing surfaces, As a result thereof, the journals have to be relatively long. On account thereof both the feed and the discharge of the material are rendered difficult and special releasing devices have to be built-in on the discharge side. Further, insertion of the grinding members into the feed drum is also made difficult. Another inconvenience of conventional mill drums, consists in that the driving device for rotating the drums comprises gear wheels in mesh with a gear ring extending around the circumference of the drum. With normal dimensions of the mill drum the gear ring is of great diameter and usually has to be composed of sections which are difficult to assemble. Efforts have been made to eliminate the difficulties in mounting the drums by providing the drums with rails or rings which extend around the circumference of the drums and are running on rollers, but this arrangement results in high pressures per unit area with consequent rapid wear.

The main object of this invention is to eliminate the above inconveniences and the invention is characterized in its broadest aspect in that the drum is entirely or partly supported by one or more endless belts or bands preferably consisting of reinforced rubber, one run of each belt engaging the surface of the drum barrel along a certain part of the circumference of the drum, the belts running over pulleys the shafts of which are parallel to the axis of rotation of the drum.

Due to the this arrangement, several advantages are obtained as compared with prior constructions in which the drum is supported by journals at the end walls. In a system according to the invention the end walls need not assist in supporting the drum and can be made lighter, and more simple especially due to the fact that the journals can be entirely omitted which opens the possibility of providing the end walls with comparatively wide inlet and outlet openings. Since the supporting places for the drum are located on the drum barrel and consequently are closer to each other than in the case where the drum is supported by journals at the end walls, the bending stresses acting on the drum will be reduced so that the thickness of the drum barrel also can be reduced resulting in that the drum in its entirety will be lighter and less expensive. Further, in the absence of long journals, the feed of the material is simplified which also holds true of the releasing devices on the discharge side. As compared with prior constructions having annular rails running on rollers a considerably reduced supporting pressure per unit area is obtained due to the fact that the belt or band can be sufficiently wide, since the width and other dimensions of the belt have no influence on the weight of the drum.

Gear rings and gear wheels for rotating the drum can be omitted if one of two supporting pulleys for one and the same belt is provided with or coupled to a drive shaft such that the belts can act not only to support but also to rotate the drum.

In certain constructions it may be desirable to support the drum in the conventional manner by means of journals and bearings at the end walls. In such cases endless belts arranged in the above indicated manner may be provided for rotating the drum. Although in this case the main purpose of the belts is to rotate the drum, they may be arranged such as to assist in supporting the drum and partially to relieve the journal bearings at the end walls with the result that the journals can be shorter and that no gear rings and gear wheels are required for operating the drum.

Figure 5:
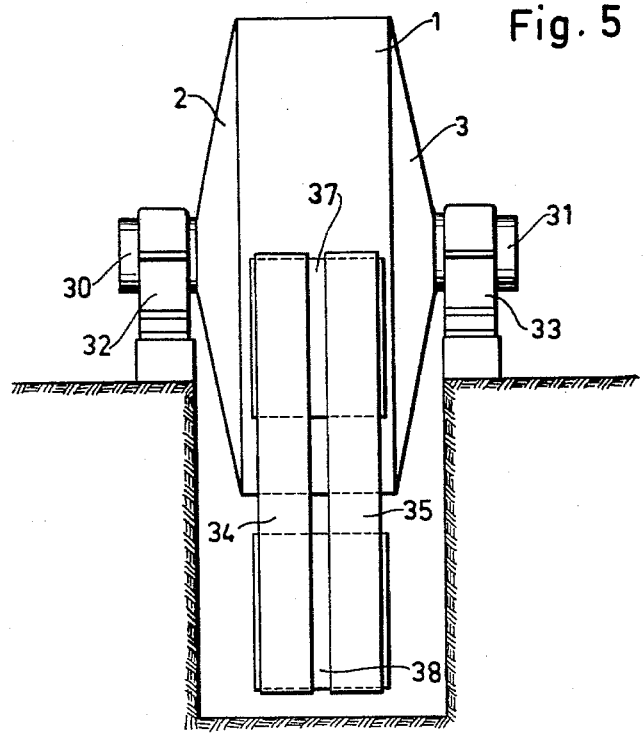
Figure 6:
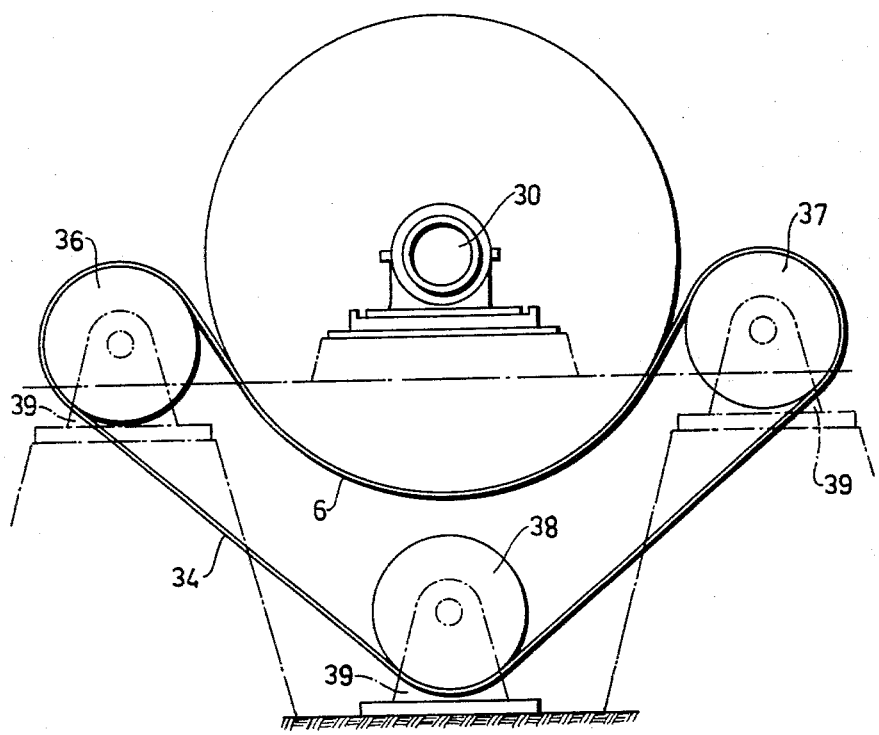
Figure 9:
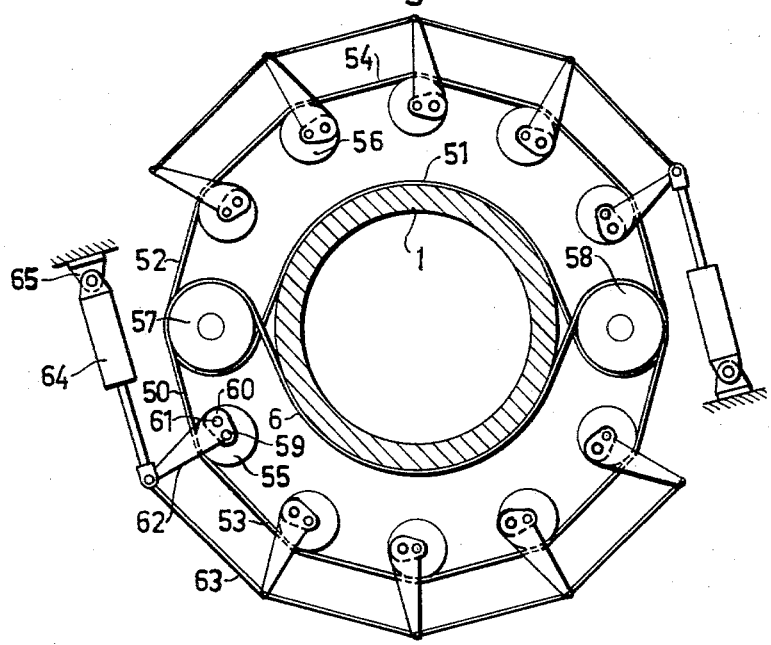
Figure 10:
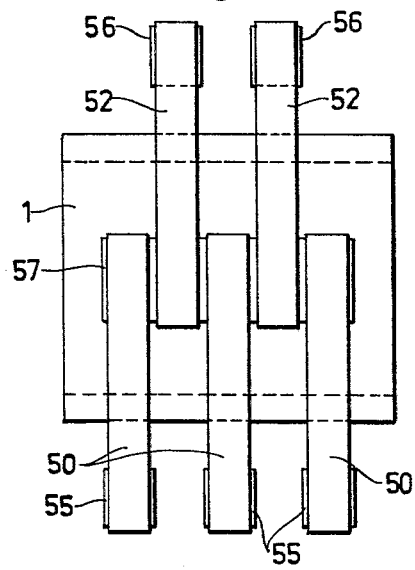
Figure 11:
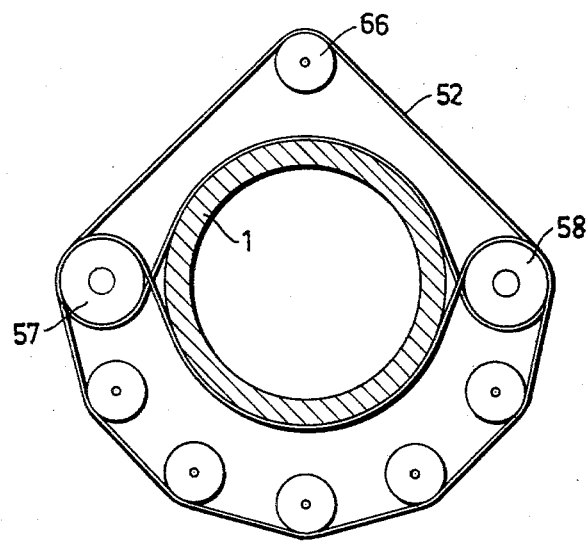
Figure 12:
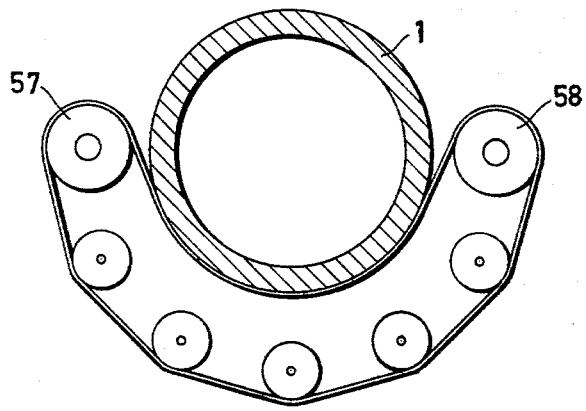

Additional features of the invention and advantages obtained thereby will appear from the following description of several embodiments illustrated in the annexed drawing. FIG. 1 is a lateral elevation, FIG. 2 an end view and FIG. 3 a top view of a mill drum supported in accordance with the invention and FIG. 4 is an end view of a similar mill drum according to a modified construction. FIGS. 5 to 8 illustrate embodiments in which the belts mainly act as driving members for rotating the drum, FIGS. 5 and 6 illustrating two elevations at right angles to each other, FIG. 7 a top view, and FIG. 8 an end elevation similar to FIG. 6 of a modification. FIGS. 9 to 11 illustrate a belt system serving as a bearing for a tubular shaft, FIG. 9 being a sectional view taken at right angles to the shaft, FIG. 10 a lateral elevation of the main parts of the system and FIG. 11 a sectional view similar to FIG. 9 of a modified arrangement. FIG. 12 is a radial sectional view of a still further modification.

Figure 2:
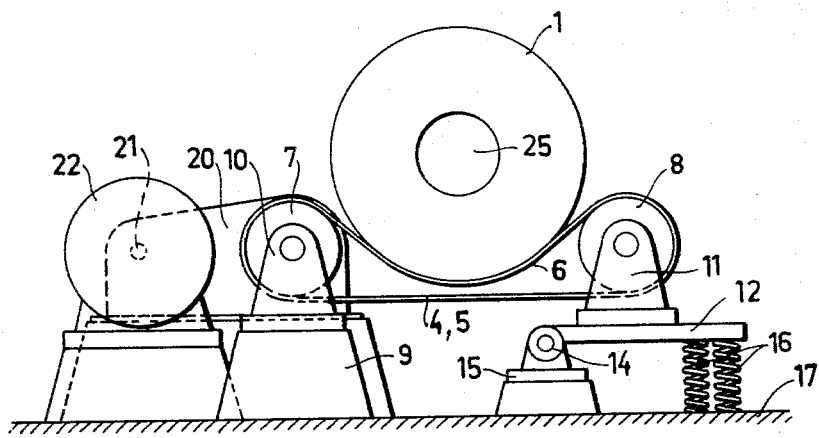

In the embodiment illustrated in FIGS. 1–3 a horizontal mill drum 1 having end walls 2 and 3 is supported by a plurality of belts or bands 4, 5. In the embodiment exemplified two parallel belts running in the same direction are provided at either end of the drum. The drum rests on the upper run 6 of the belts which are sagging between a pair of pulleys 7, 8 located on a level with each other and provided one on each side of the drum. The pulley 7 is supported by a plummer block 10 secured on a fixed base 9, whereas the plummer block 11 for the other pulley 8 is supported by a plate 12 which at one end is pivotally mounted on a pivot 14 which extends parallel to the axes of rotation of the pulleys 7 and 8 and is supported by a fixed plummer block 15. Near its other end the plate 12 rests on a plurality of springs 16 which are illustrated in the form of helical springs having vertical axes and secured to the foundation 17. The pulleys 7 over which all of the belts 4 and 5 run on one side of the drum are keyed on shafts 18 and 19, respectively, which are connected to the output shafts of a change gear 20 common to both groups of belts. The input shaft 21 of the change gear is connected to a driving motor 22. In this embodiment and those referred to hereinbelow the change gear may be a differential gear to obtain equal propelling force on both belts. Alternatively, the change gear may be omitted and each belt be driven by its separate motor. Consequently, the pulleys 7 can be driven and impart movements to the belts such that the drum which rests on the belts and is surrounded thereby along part of its circumference can be rotated while rolling on the upper runs 6 of the belts. The drum is axially maintained in position by means of guide rollers 23 and 24 which are rotatable about shafts extending at right angles to the axis of the drum. The rollers engage the end walls 2 and 3, respectively, of the drum.

Since in the system described the drum is both supported and rotated by the belts, journals for supporting and mounting the drums as well as gear rings extending around the circumference of the drum and cooperating with driving gear wheels can be omitted. The inlet opening 25 for the material to be ground in the drum and the outlet opening 26 for the ground material in the end walls 2 and 3, respectively, of the drum can consequently be made sufficiently wide to render possible simplification of the feeding and discharging devices. In addition, insertion and removal of the grinding members in the drum such as balls, rods, stones and the like is facilitated. The drum is supported by the belts on comparatively large areas and at places located considerably closer to each other than in the case where the drum is supported by journals on the end walls. As a result thereof, the pressure per unit bearing area is low and the stresses on the drum barrel are reduced so that the wall of the barrel can be comparatively thin.

In order to increase the angle of belt contact with the drum barrel, the other run 27 of the belt may extend around guide pulleys 28 and 29 which keep said other run 27 spaced apart from the first run 6, as shown in FIG. 4. In this embodiment, the shafts of the pulleys 7 are on a level with the axis of rotation of the drum 1 in diametrically opposite positions with respect to the drum. The pulleys 7, 28 and 29 are disposed symmetrically with respect to a vertical axial plane of the drum.

In case of drums in which the feed and discharge need not occur centrally through the end walls of the drum journals 30, 31 may be provided on the end walls 2 and 3, respectively, as shown in the embodiments illustrated in FIGS. 5–8. These journals may be mounted in the usual manner in fixed bearings 32 and 33, respectively. The upper run 6 of a pair of belts 34, 35 are in contact with the lower side of the barrel of the drum 1 and extend over pulleys 36 and 37 one on each side of the drum. The other runs of the belts extend over a guide pulley 38 provided in a pit below the drum. All of the pulleys 36, 37, 38 are mounted in fixed plummer blocks 39. In this instance both pulleys 36 and 37 are driving the belts and are keyed on shafts 40 and 41, respectively, connected to the output shafts 42 and 43, respectively, of gear boxes 44, 45, respectively, the input shafts 46 and 47 of which are connected to the shaft of a driving motor 48 and 49, respectively. The motors 48, 49 are adapted to rotate synchronously and such that the pulleys 36 and 37 are driven at equal peripheral speeds and in the same direction.

In the embodiment illustrated in FIGS. 5 to 7 the guide pulley 38 may be adjustable toward and away from the drum for regulating the tension of the belts 34, 35. The tension of the belts may be adjusted such that the belts are able to sustain part of the weight of the drum so as to reduce the bearing pressure on the journals 30 and 31.

Figure 8:
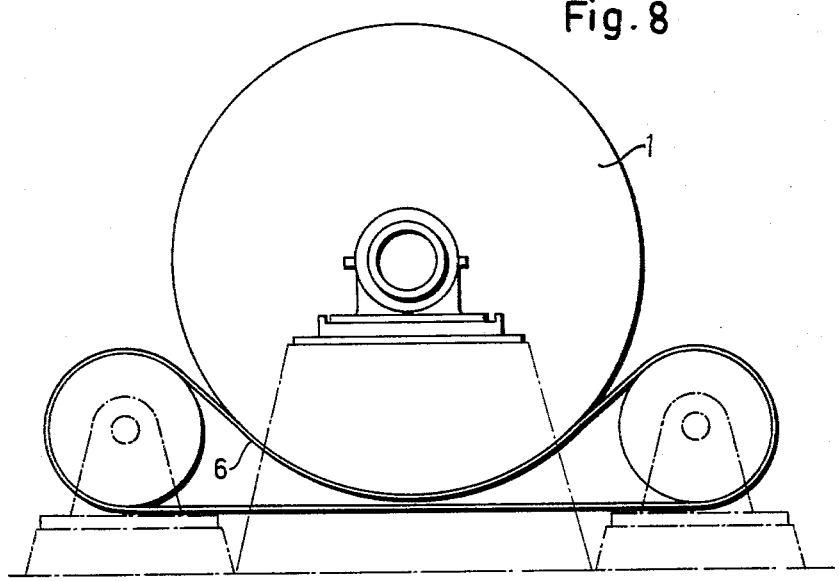

As will be seen from a comparison between FIGS. 6 and 8, the embodiment according to FIG. 8 is simplified due to the omission of the guide pulley 38, resulting in a decrease of the angle of belt contact. This simplified embodiment may be suitable in connection with small-size drums or low-power drums.

The invention is also applicable to systems in which the belts are exclusively supporting and guiding a drum or shaft and substantially constitute a bearing. Generally, one or several of the above described embodiments may be used for this purpose except that none of the pulleys is driving the belts. Especially suitable embodiments of belt bearings are illustrated in FIGS. 9–12. In the modification according to FIGS. 9 to 11, a drum, journal or similar member 1 is supported by the upper runs 6 of a plurality of belts 50 which sustain the drum or the like on the lower side thereof. The opposite or upper side of the drum is engaged by the runs 51 of a plurality of belts 52. The external runs 53 and 54, respectively, of the belts extend over guide pulleys 55 and 56, respectively. Two pulleys 57 and 58 located in diametrically opposite position with respect to the drum are common to both groups of belts resulting in that the runs 6 and 51 engaging the drum substantially surround the entire circumference of the drum. As shown in FIG. 10 the belts of each group of belts are located symmetrically with respect to the radial central plane of the drum 1. The belts 52 engage the pulleys 57 and 58 at places between the parallel belts 50. The pulleys 55 and 56 are stretching pulleys. Their shafts 59 are mounted on crank webs 60 which are connected with actuating levers 62 mounted on pivots 61. By means of a wire 63 or similar connecting member all of the actuating levers 62 of the stretching pulleys 55 are connected to each other and to a tensioning device 64 which may consist of a spring, a hydraulic cylinder or the like pivotally secured to a mounting 65. Similar tensioning devices are provided for stretching the belts 52 by means of the pulleys 56. The embodiment shown in FIGS. 9 and 10 can be simplified as illustrated in FIG. 11 by the provision of a single guide pulley 66 for the upper belts 52 or may be further simplified, as shown in FIG. 12, by omitting all of the upper belts. In this case the angle of belt contact should be comparatively great which means that the pulleys 57 and 58 should be located in diametrically opposite positions with respect to the drum such that their shafts are located horizontally on a level with or even higher than the axis of rotation of the drum. In this case the angle of belt contact is about 180° and may even be greater.

The invention is not limited to the embodiment described. According to an example of a further modification one end of the drum may be conventionally supported by a bearing, such as journal bearing or roller bearing, whereas the other end of the drum may be supported by belts in a manner described with reference to any of the embodiments illustrated. In cases where it is desired to stretch the belts the required tightening force may be exerted by springs, counterweights or hydraulic or pneumatic cylinders.

What is claimed is:

1. Drum arrangement, comprising a drum, an endless belt unit having an upper run supporting said drum along a part of its circumference on the upper surface of said upper run, a further endless belt unit contacting said drum along a part of the circumference of the drum which is opposite the part engaged by the first endless belt unit, one of said units comprising a drive pulley for driving its belt to rotate the drum about the axis of the drum.

2. Drum arrangement, comprising a drum and endless belt units, each unit comprising an endless belt and pulleys for driving said belt and guiding it to engage one run of the belt with the circumference of the drum, two pulleys being common to two belt units with said two pulleys on opposite sides of the drum, and resilient means actuating said guide pulleys for applying tension to the endless belts.

3. Drum arrangement, comprising a drum adapted to be rotated about a horizontal axis, shafts parallel with the axis of the drum, a pair of pulleys carried rotatably on said shafts and an endless belt running over said pulleys, the outside of one run of said belt carrying the drum by engaging the surface of the drum along a part of the circumference thereof, means coupled to one shaft for rotating the pulley thereof and for driving the belt to rotate the drum, guide pulleys for the run of the endless belt which is free from engagement with the drum, and yieldable tensioning means for moving said guide pulleys for applying tension to the belt.

References Cited by the Examiner

UNITED STATES PATENTS

| | | | |
|---|---|---|---|
| 818,211 | 4/06 | Abbe | 241—176 |
| 1,280,375 | 10/18 | Bergman | 51—164 |
| 2,552,855 | 5/51 | Johnston | 68—140 X |
| 2,833,137 | 5/58 | Geldhof | 68—140 X |

FOREIGN PATENTS

| | | |
|---|---|---|
| 34,868 | 3/86 | Germany. |

ROBERT C. RIORDON, *Primary Examiner.*

J. SPENCER OVERHOLSER, *Examiner.*